US007257451B2

United States Patent
Carpency et al.

(10) Patent No.: US 7,257,451 B2
(45) Date of Patent: Aug. 14, 2007

(54) METHOD FOR CREATING A LINEAR PROGRAMMING MODEL OF AN INDUSTRIAL PROCESS FACILITY

(75) Inventors: Jay F. Carpency, Seabrook, TX (US); Derek W. Watret, Dunfermline (GB)

(73) Assignee: Exxon Mobil Chemical Patents Inc., Houston, TX (US)

( * ) Notice: Subject to any disclaimer, the term of this patent is extended or adjusted under 35 U.S.C. 154(b) by 17 days.

(21) Appl. No.: 11/341,198

(22) Filed: Jan. 27, 2006

(65) Prior Publication Data
US 2006/0184254 A1 Aug. 17, 2006

Related U.S. Application Data

(60) Provisional application No. 60/652,961, filed on Feb. 15, 2005.

(51) Int. Cl.
*G05B 13/02* (2006.01)
(52) U.S. Cl. .............................. 700/30; 700/28; 700/29
(58) Field of Classification Search ................. 700/30, 700/29, 28
See application file for complete search history.

(56) References Cited

U.S. PATENT DOCUMENTS

| | | | | |
|---|---|---|---|---|
| 5,315,521 A * | 5/1994 | Hanson et al. | ............... | 700/103 |
| 5,666,297 A | 9/1997 | Britt et al. | ................... | 364/578 |
| 5,950,170 A * | 9/1999 | Pan et al. | ....................... | 705/7 |
| 6,219,649 B1 * | 4/2001 | Jameson | ......................... | 705/8 |
| 6,442,513 B1 | 8/2002 | Cheng et al. | .................. | 703/12 |
| 6,624,577 B2 * | 9/2003 | Jameson | ......................... | 705/8 |
| 6,993,462 B1 * | 1/2006 | Pavlovi et al. | ................. | 703/2 |
| 2003/0097194 A1 | 5/2003 | Gade et al. | .................... | 700/52 |
| 2003/0097243 A1 | 5/2003 | Mays et al. | ..................... | 703/2 |

FOREIGN PATENT DOCUMENTS

| EP | 582069 | 9/1994 |
|---|---|---|
| WO | WO 2004/038535 | 6/2004 |

* cited by examiner

*Primary Examiner*—Thomas K. Pham
(74) *Attorney, Agent, or Firm*—Keith A. Bell

(57) ABSTRACT

A method for creating a linear programming (LP) model of an industrial process facility is disclosed. The model may be used for interactively simulating and/or optimizing the operation of the facility to facilitate feedstock selection and/or other economic analyses. According to the inventive method, a first principles reference tool is used to create a non-linear reference model of the entire facility. Then, independent input variables and key output variables are specified, and initial values for the independent input variables are specified. Base case values for each key output variable are determined by running the non-linear reference model using the specified initial values for the independent input variables. Next, partial derivatives for each key output variable with respect to each independent input variable are determined. A matrix is constructed containing the base case values and partial derivatives. The matrix serves as the depiction of the industrial process facility in the final LP, which may also include prices, availabilities, and other external constraints.

32 Claims, 5 Drawing Sheets

| | | | FD CH4 | FD C2H4 | FD C2H6 | FD C3H6 | FD C3H8 | FD C4H10 |
|---|---|---|---|---|---|---|---|---|
| H2 PROD | Mlb/hr | 40.424 | 5.204 | 0.500 | 353.128 | 0.300 | 5.884 | 0.300 |
| FUELGAS KLB H | Mlb/hr | 17.842 | 4.404 | 0.000 | 345.228 | 0.000 | 5.684 | 0.000 |
| ETHYLENE PRODUCTION | Mlb/hr | 271.762 | 0.800 | 0.500 | 7.900 | 0.300 | 0.200 | 0.300 |
| DEETHBTMS | Mlb/hr | 38.729 | 0.421 | 0.021 | 0.132 | 0.086 | 0.159 | 0.140 |
| SCN | Mlb/hr | 1.635 | 0.508 | 0.063 | 0.041 | 0.252 | 0.202 | 0.206 |
| FUELOIL | Mlb/hr | 0.671 | 0.076 | 0.746 | 0.751 | 0.492 | 0.488 | 0.494 |
| FUELGAS PRODUCTION | Mlb/hr | 17.842 | 0.010 | 0.126 | 0.066 | 0.123 | 0.144 | 0.129 |
| FUELGAS FUELVALUE | MM BTU/hr | −436.196 | −0.014 | 0.034 | 0.008 | 0.034 | 0.002 | 0.023 |
| FURNACES FIRING | MM BTU/hr | 1974.689 | −0.002 | 0.009 | 0.002 | 0.013 | 0.005 | 0.007 |
| 1500#STEAM TO PGC | Mlb/hr | 968.450 | 0.508 | 0.063 | 0.041 | 0.252 | 0.202 | 0.206 |
| POWER TO C2REFG MTR | kW | 6720.578 | −10.842 | −1.428 | −1.025 | −5.408 | −4.372 | −4.459 |
| PGCSTG3OUT PRES | psig | 169.641 | 2.530 | 1.609 | 5.553 | 1.134 | 3.215 | 3.078 |
| PGC SPEED | rpm | 5029.796 | 1.357 | 0.857 | 1.667 | 0.676 | 0.964 | 0.980 |
| C2REFG POWER HP | HP | 8670.004 | 16.280 | 2.626 | 7.094 | 4.402 | 6.497 | 6.129 |
| C3REFG POWER HP | HP | 34040.045 | 0.026 | −0.072 | −0.064 | −0.064 | −0.030 | −0.044 |
| FD METHANE | Mlb/hr | 4.404 | 1.000 | | | | | |
| FD ETHYLENE | Mlb/hr | 0.000 | | 1.000 | | | | |
| FD ETHANE | Mlb/hr | 345.228 | | | 1.000 | | | |
| FD PROPYLENE | Mlb/hr | 0.000 | | | | 1.000 | | |
| FD PROPANE | Mlb/hr | 5.684 | | | | | 1.000 | |
| FD BUTANE | Mlb/hr | 0.000 | | | | | | 1.000 |
| DEETH EXTFD MAPD | Mlb/hr | 0.449 | | | | | | |
| DEETH EXTFD PROPYLENE | Mlb/hr | 13.632 | | | | | | |
| DEETH EXTFD PROPANE | Mlb/hr | 1.715 | | | | | | |
| FURNACE CONVERSION | none | 69.000 | | | | | | |
| FURNACE SHC | none | 0.400 | | | | | | |
| CW TEMP | °F | 78.600 | | | | | | |

| | MAPD | C3E | C3O | FRN CONV | FRN SHC | CW TEMP | LP RESULT | NLP RESULT | ERROR (%) |
|---|---|---|---|---|---|---|---|---|---|
| H2 PROD | 1.249 | 19.232 | 3.315 | 70.300 | 0.350 | 81.500 | 42.543 | 42.560 | -0.04 |
| FUELGAS KLB H | 0.449 | 13.632 | 1.715 | 69.000 | 0.400 | 78.600 | 19.203 | 19.212 | -0.05 |
| ETHYLENE PRODUCTION | 0.800 | 5.600 | 1.600 | 1.300 | -0.050 | 2.900 | 276.512 | 276.473 | 0.01 |
| DEETHBTMS | | | | 0.441 | -1.135 | | 47.835 | 47.814 | 0.04 |
| SCN | 0.999 | | 0.999 | 0.258 | -1.667 | | 2.169 | 2.200 | -1.42 |
| FUELOIL | | | | -1.305 | 6.212 | | 0.794 | 0.801 | -0.78 |
| FUELGAS PRODUCTION | | 0.999 | | 0.245 | -1.970 | | 19.203 | 19.212 | -0.05 |
| FUELGAS FUELVALUE | -0.005 | | -0.004 | 0.294 | -1.275 | | -465.843 | -466.029 | -0.04 |
| FURNACES FIRING | -0.002 | -0.005 | 0.003 | 0.065 | -0.234 | | 1983.352 | 1982.879 | 0.02 |
| 1500#STEAM TO PGC | | | | 0.258 | -1.667 | | 982.879 | 983.500 | -0.06 |
| POWER TO C2REFG MTR | | 0.003 | 0.005 | -5.092 | 33.393 | | 6809.826 | 6808.178 | 0.02 |
| PGCSTG3OUT PRES | | | | -10.562 | 524.252 | 1.302 | 169.416 | 169.364 | 0.03 |
| PGC SPEED | -0.002 | | 0.004 | -3.601 | 0.755 | -0.010 | 5103.449 | 5103.684 | 0.00 |
| C2REFG POWER HP | | 0.004 | 0.007 | 11.664 | 15.098 | | 8785.140 | 8783.015 | 0.02 |
| C3REFG POWER HP | 5.850 | 5.858 | 5.857 | 0.554 | 0.056 | -0.132 | 35414.967 | 35417.990 | -0.01 |
| FD METHANE | | | | -14.500 | 28.978 | 8.479 | 5.204 | 5.204 | 0.00 |
| FD ETHYLENE | | | | 15.048 | 19.478 | -0.013 | 0.500 | 0.500 | 0.00 |
| FD ETHANE | | | | -443.101 | 712.124 | 302.230 | 353.128 | 353.128 | 0.00 |
| FD PROPYLENE | | | | | | | 0.300 | 0.300 | 0.00 |
| FD PROPANE | | | | | | | 5.884 | 5.884 | 0.00 |
| FD BUTANE | | | | | | | 0.300 | 0.300 | 0.00 |
| DEETH EXTFD MAPD | 1.000 | | | | | | 1.249 | 1.249 | 0.00 |
| DEETH EXTFD PROPYLENE | | 1.000 | | | | | 19.232 | 19.232 | 0.00 |
| DEETH EXTFD PROPANE | | | 1.000 | | | | 3.315 | 3.315 | 0.00 |
| FURNACE CONVERSION | | | | 1.000 | | | 70.300 | 70.300 | 0.00 |
| FURNACE SHC | | | | | -0.100 | | 0.350 | 0.350 | 0.00 |
| CW TEMP | | | | | | 1.000 | 81.500 | 81.500 | 0.00 |

METHOD FOR CREATING A LINEAR PROGRAMMING MODEL OF AN INDUSTRIAL PROCESS FACILITY

CROSS REFERENCE TO RELATED APPLICATION

This application claims the benefit of Provisional Application No. 60/652,961 filed Feb. 15, 2005, the disclosure of which is incorporated by reference.

FIELD OF THE INVENTION

This invention relates to a method for creating a linear programming (LP) model of an industrial process facility from a non-linear reference model of the facility. The resulting LP model may be used to simulate and/or optimize the operation of the facility.

BACKGROUND OF THE INVENTION

As used herein, the term "industrial process facility" shall mean any facility that is adapted to refine, purify, convert, consume, or otherwise process any material to produce desired products, and includes, but is not limited to, petroleum refineries, catalytic and steam crackers, petrochemical plants, other chemical plants (i.e., chemical plants that are not based on petrochemicals), facilities for converting natural gas and/or methanol into other hydrocarbons, natural gas liquefaction plants, polymer and plastics plants, steel mills, pharmaceutical manufacturing plants, and electric power generating plants. In some cases, an industrial process facility may include two or more separate facilities, such as a petroleum refinery together with one or more steam crackers.

Industrial process facilities typically consist of a plurality of separate process units or sections of process units that function together to achieve the overall objective of the facility. As used herein, a "process unit" is an apparatus or the equipment that performs a specific function, such as a process gas compressor unit, a fractionator, a reformer, a hydrotreater, a distillation column, a quench tower, a de-ethanizer, a cogeneration unit, or a refrigeration unit, and a "section" of process units is a grouping of two or more associated process units, such as the recovery section of a steam cracker.

Difficulties arise in effectively controlling and optimizing the operation of an industrial process facility due to factors such as the wide variety of separate process units and equipment that may be contained in the facility, the large number of process variables, the large number of potential feedstocks and feedstock compositions, operating variables (e.g., flow rates, temperatures, pressures, etc.), product specifications, market constraints and prices (e.g., for feeds, products, and utilities), mechanical constraints, transportation and storage constraints, and weather conditions. Consequently, the industrial process industries have attempted to develop computer models that can be used to accurately simulate and/or optimize the operation of an industrial process facility.

Commercially available tools have been developed to facilitate such computer modeling and optimization. These commercially available tools can be broken down into two distinct types: first principles reference tools and derived tools.

First principles reference tools are tools that are based on first principles (i.e., mathematical relationships or logic that utilize accepted scientific theories or laws, such as those regarding chemical thermodynamics and/or kinetics, which theories or laws have been validated through repeated experimental tests) and that typically possess the capability to separately model many or all of the individual process units in an industrial process facility. First principles reference tools also typically possess a library that provides thermodynamic information about how different molecules, components, or pseudo-components will perform in these process units. These tools can be used to create a model of an industrial process facility, or section thereof, by using the thermodynamic library to individually model the various process units in the facility and then connecting the process units appropriately to reflect the overall facility. Such a model can then directly provide heat and material balance information, which can be used for design, equipment rating, equipment performance, simulation, and optimization of the facility. Unfortunately, first principles reference models tend to be computationally intensive and, accordingly, substantial computer time and resources can be required to run a model based thereon. Examples of commercially available first principles reference tools are HYSIS® and Aspen Plus®, which are products of Aspen Technologies Incorporated of Cambridge, Mass.; PRO/II®, which is a product of SimSci-Esscor, an operating unit of Invensys plc of Cheshire, United Kingdom; and SPYRO®, which is a product of Technip-Coflexip SA of Paris, France.

Derived tools are tools that possess very convenient structures to depict many or all of the process unit operations needed to model an industrial process facility. These derived tools have convenient report writing capabilities, and may possess various analysis tools to help explain the modeling results. In general, derived tools use either linear programming (LP) or sequential linear programming (SLP) type mathematics to solve optimization problems. However, these tools do not have the capability to model process unit operations based on first principles, nor do they contain a thermodynamic library to describe how different molecules, components, or pseudo-components would perform in such process unit operations. As such, these derived tools cannot directly provide heat and material balance information for use in design, equipment rating, equipment performance, simulation, and optimization of the facility. Rather, to create a model in these derived tools requires that a depiction of the facility to be modeled be developed in some other engineering tool (e.g., HYSIS®, Aspen Plus®, PRO/II®, and SPYRO®, referred to above, as well as other commercially available engineering tools that would be well known to persons skilled in the art of modeling industrial process facilities), and this depiction is then imported into the derived tool. Nevertheless, given their convenient form and analysis capabilities, as well as the computing advantages of LP or SLP programming, derived tools have generally been preferred for use in operational planning, feedstock selection, and optimization of an industrial process facility. Examples of commercially available derived tools are AspenTech PIMS®, which is a product of Aspen Technology Incorporated of Cambridge, Mass., and SimSci Petro®, which is a product of SimSci-Esscor, an operating unit of Invensys plc, of Cheshire, United Kingdom.

Heretofore, creating and maintaining a derived computer model of an industrial process facility has, of necessity, been a piecemeal process. Separate models of individual process units in the facility had to be created and then interconnected to represent the overall facility, and intermediate stream connectivities had to be accounted for. An intermediate stream is a stream that flows from one process unit into one or more other process units. For example, a product stream from an upstream process unit may become an input stream to one or more downstream process units, or a recycle stream from a downstream process unit may become an input stream to one or more upstream process units. Thus, a change in the products from a particular upstream process unit may cause a change in a recycle stream from a downstream process unit, which in turn may cause another change in the same or a different upstream process unit. The overall derived computer model for the facility must accurately model these effects.

As an example, the following steps have typically been required to create a derived model of a steam cracker:

First, a suitable depiction of each of the process units in the steam cracker for which a model is desired must be identified and/or developed. As noted above, such a depiction has typically come from some form of separate engineering tool. Often, the engineering tools used differ depending on the process unit being modeled, and the use of different engineering tools to create the process unit depictions can result in consistency problems within the final derived model. Sometimes, only a simple mass balance depiction may be used, but such a simple depiction may miss important energy effects, and may not be able to represent constraints with sufficient accuracy. Suitable constraint depiction and energy representation usually requires heat and mass balance information, which in turn often comes from a first principles reference model including some underlying thermodynamic properties representation.

Second, after the depiction of an individual process unit has been developed, it is "perturbed," usually by altering a single independent input variable (often referred to as a "x-variable," such as a single component feed rate or operating parameter) with the important output variables (often referred to as "y-variables") being monitored. In a well-defined derived model for a given process unit of a steam cracker, the number of x-variables would include all independent variables, which in turn would translate to one for each component in each stream entering the process unit, plus the number of independent operating conditions in the process unit that can be perturbed, plus the number of tuning variables available in the process unit. Important output variables are those that directly impact economic performance of the steam cracker (such as product rates or qualities, energy consumption, and process constraints), as well as other key performance variables that are considered important to monitor within the steam cracker.

Then, what is known as a "vector" or "shift" is created. Such a vector or shift is simply the partial derivative of each of the y-variables with respect to the perturbed x-variable. This "partial derivative" may be either an "analytical" partial derivative or a "numerical" partial derivative.

Next, the perturbed x-variable is reset to its original value and the next x-variable is perturbed, with a new vector or shift being calculated for this x-variable. This process is repeated until all of the independent x-variables have been perturbed. The result of this process is a matrix containing the partial derivatives of each y-variable with respect to each x-variable for the particular process unit in question.

Finally, the matrices for each of the individual process units are interconnected (with intermediate stream connectivities accounted for) so as to create a derived model of the overall facility.

There are several problems inherent in the procedure described above. For example, a complex steam cracker may have 15 or more separate process units that must be accurately modeled to create the overall derived model. It is unlikely that depictions for all of these process units can be developed in the same engineering tool, let alone on a totally consistent heat and material balance basis. Moreover, complex steam crackers typically have a large number of recycle streams that must be accurately modeled. When the individual derived models for each process unit and recycle streams are joined together to form the overall derived model for the facility, inconsistencies between individual derived models (e.g., inconsistencies in the underlying engineering tools or in the heat and material balance basis) can result in a more difficult validation process and, in some situations, in non-convergence or unacceptable inaccuracies in the overall model.

Obviously, the above approach to model development is very difficult. But the Achilles Heel of this approach has been in the maintenance of the derived model over time to ensure that the model continues to accurately reflect to the steam cracker. In actuality, steam cracker performance changes over time. For example, process units become fouled over time (or get cleaned). Operating configurations are altered (e.g., multiple processing options exist, and these options change from time to time), and often new processing options are introduced. Further, the steam cracker recovery section performance (particularly in compressor areas) is actually not linear at all. While this performance can be adequately approximated by a linear relationship over a portion of the operating window, major moves from the original derivation point often result in significant non-linear effects that cause the original depiction and derivatives based thereon to become too inaccurate to adequately represent the steam cracker. Hence, frequent re-derivation of the derivatives may be required to ensure that the model continues to accurately represent the steam cracker.

The process industries have attempted to resolve these problems. However, to date, none of the proposed solutions has been entirely satisfactory.

U.S. Patent Application Publication No. 2003/0097243 A1 discloses a computerized system and method for operating a hydrocarbon or chemical production facility, comprising mathematically modeling the facility; optimizing the mathematic model with a combination of linear and non-linear solvers; and generating one or more product recipes based upon the optimized solution. In one embodiment, the mathematic model further comprises a plurality of process equations having process variables and corresponding coefficients. Preferably, these process variables and corresponding coefficients are used to create a matrix in a linear program. The linear program may be executed by recursion or distributed recursion. Upon successive recursion passes, updated values for a portion of the process variables and corresponding coefficients are calculated by the linear solver and by a non-linear solver, and the updated values for the process variables and corresponding coefficients are substituted into the matrix. Unfortunately, the simultaneous use of multiple solvers, some of which are non-linear, can result in significant computing time and resource disadvantages.

U.S. Pat. No. 5,666,297 discloses a software system for simulating and optimizing a processing plant design. The software system includes a plurality of dual mode equipment models for simulating each piece of equipment in the processing plant design. A sequential modular simulation routine is used to execute the equipment models in a first mode to define a first set of values of the operating parameters of the processing plant design. Then, a simultaneous simulation/optimization routine executes the equipment models in a second mode. The simultaneous simulation/optimization routine utilizes the first set of values for the plant's operating parameters from the sequential simulation routine and subsequently determines a second set of values of the operating parameters at which the processing plant design is optimized. The equipment models after execution by the sequential simulation routine and the simultaneous simulation/optimization routine store the first and second sets of values for the operating parameters in a common plant model file.

U.S. Pat. No. 6,442,513 discloses a method for real-time optimization of an oil refinery, or a portion thereof, wherein a fluid stream having multiple physical components is modeled as a plurality of pseudo-components. Each physical component has a boiling point, and each pseudo-component has a pre-defined boiling point and includes all physical components from the fluid stream having approximately the pre-defined boiling point. According to this patent, good modeling results may be obtained by grouping compounds and molecules into pseudo-components or lumps based on boiling points, and by modeling based on such lumps. This is especially true in view of the fact that much of the operation of a refinery depends on boiling points of compositional components of crude oil.

U.S. Patent Application Publication No. 2003/0097194 A1 discloses a method for pre-calculating the parameters of industrial processes and/or products. According to this method, a vector of admissible input variables of the industrial process and/or product is defined. Definition ranges are assigned to each variable in the input vector. A process output vector is determined with the pre-calculable process parameters. Known information on the process is stored in a data bank and ranges of validity for the process input variables are allocated to this information. For each process input vector inputted from an admissible definition range provided with valid information, exactly one process output vector is determined according to the information valid therefor.

Recently, a new generation of first principles reference tools has been developed that are capable of modeling, solving, and optimizing an entire industrial process facility. Examples of these new reference tools are AspenTech RT-OPT®, which is a product of Aspen Technology Incorporated of Cambridge, Mass., and SimSci ROMeo®, which is a product of SimSci-Esscor, an operating unit of Invensys plc, of Cheshire, United Kingdom. These tools are capable of solving very large optimization problems, usually via a non-linear simultaneous equation solver and optimizer. However, given the enormous size and complexity of a first principles reference model for an entire industrial process facility, as well as its non-linear nature, solution of the model can require huge amounts of computing resources and can take substantial periods of time, especially in optimization mode.

Obviously, there is a need for a method to combine the modeling capabilities of this new generation of first principles reference tools with the computing advantages of linear programming (LP) or sequential linear programming (SLP) models. The present invention satisfies this need.

SUMMARY OF THE INVENTION

In a first embodiment, the present invention is a method for creating a linear programming (LP) model of an industrial process facility that comprises the steps of (a) using a first principles reference tool to create a non-linear reference model of the industrial process facility, (b) specifying a plurality of independent input variables and a plurality of key output variables, (c) specifying an initial value for each of the independent input variables, (d) running the reference model to determine base case values for each of the key output variables based on the specified initial values for the independent input variables, (e) determining partial derivatives for each of the key output variables with respect to each of the independent input variables, (f) creating a matrix at least (n+1) columns wide by m rows high, where "n" is the number of independent input variables and "m" is the number of key output variables, one column of the matrix containing the base case values for each of the key output variables from step (d) and the other n columns of the matrix containing the partial derivatives for each of the key output variables with respect to each of the independent input variables from step (e) except, optionally, those partial derivatives having a value smaller than a pre-selected minimum value, and (g) constructing a LP model of the industrial process facility, the LP model containing the matrix from step (f) and being adapted to calculate the value of one or more of the key output variables from the matrix and a set of known and/or assumed values for the independent input variables. Prices, availabilities, and external constraints may be added to the LP model to permit it to be used for simulation and/or optimization of the industrial process facility.

Preferably, the independent input variables include, without limitation, feedstock flow rates and feedstock compositions (or, alternatively, flow rates for each feedstock component), flow rates for each component in all external feed streams, and operating parameters for the industrial process facility. Key output variables preferably include, without limitation, flow rate of each product, amount of energy consumed, and values for potential system constraints.

The step of determining partial derivatives of each key output variable with respect to each independent input variable may be performed by individually perturbing the value of each independent input variable, running the reference model, observing the resulting change in each of the key output variables, resetting the independent input variable to its initial value, and repeating these steps for each other independent input variable. Alternatively, the first principles reference tool may be adapted to generate a sensitivity matrix from the Jacobian matrix created by the reference tool in solving the reference model, and the partial derivatives may be extracted from the sensitivity matrix.

In another embodiment, the invention is a method for creating a linear programming (LP) model of an industrial process facility that includes at least two separate sections that can be operated either jointly or separately. According to this embodiment, a first principles reference tool is used to create a single non-linear reference model of the entire industrial process facility. However, separate LP models are created, using the process described above, for each of the sections of the facility. This permits each of the sections to be simulated and/or optimized separately (e.g., if the other sections are not operating) or jointly with one or more other sections. Since the LP models of the sections were generated from a single reference model, they are fully consistent with each other.

In yet another embodiment, the invention is a method for creating a linear programming (LP) model of a steam cracker that includes at least a furnace section and a recovery section, the furnace section having multiple possible feed types (or headers of feed types) and/or multiple furnace types. According to this embodiment, a first principles reference tool is used to create a single non-linear reference model of the entire steam cracker, but separate LP models are created for the furnace section and the recovery section. Preferably, a furnace yields tool (that may be either part of or separate from the first principles reference tool) is used to calculate base case values for furnace yields and furnace energy consumption for each feed type and furnace type combination. The furnace yields tool is also used to determine partial derivatives of the furnace yields and furnace energy consumption with respect to the feedstock flow rates and feedstock compositions (or, alternatively, flow rates for each feedstock component) and each furnace operating condition for the feed type/furnace type combination. A matrix of base case values and partial derivatives is created for each desired combination of feed type and furnace type, and these matrices are included in the LP model of the furnace section. A LP model of the recovery section is constructed in the manner described above with respect to the first embodiment. The LP models of the furnace section and the recovery section are then combined in the final LP model for the steam cracker.

DESCRIPTION OF THE DRAWINGS

The attached drawings have been included for illustrative purposes only, and should not be interpreted or construed as imposing any limitations on the scope of the invention.

FIGS. 4A and 4B are an example of the matrix constructed according to the present invention for use in an LP model of a steam cracker.

DESCRIPTION OF THE PREFERRED EMBODIMENTS

The present invention is a method for creating a linear programming (LP) model of an industrial process facility. The resulting LP model may be used to facilitate simulation and/or optimization of the facility. As used herein and in the appended claims, the terms "linear programming," "LP," and "LP model" shall be deemed to also include, respectively, "sequential linear programming," "SLP," and "SLP model."

The invention may be used in connection with the computer simulation and/or optimization of any type of industrial process facility. However, the following description of the invention will, at times, be specific to use of the invention to model a steam cracker (an industrial process facility for the thermal cracking of various hydrocarbon feedstocks to produce other hydrocarbon products). It will be understood that this specificity is for purposes of illustration only, and should not be construed or interpreted as imposing any limitation on the scope of the invention.

Figure 1:
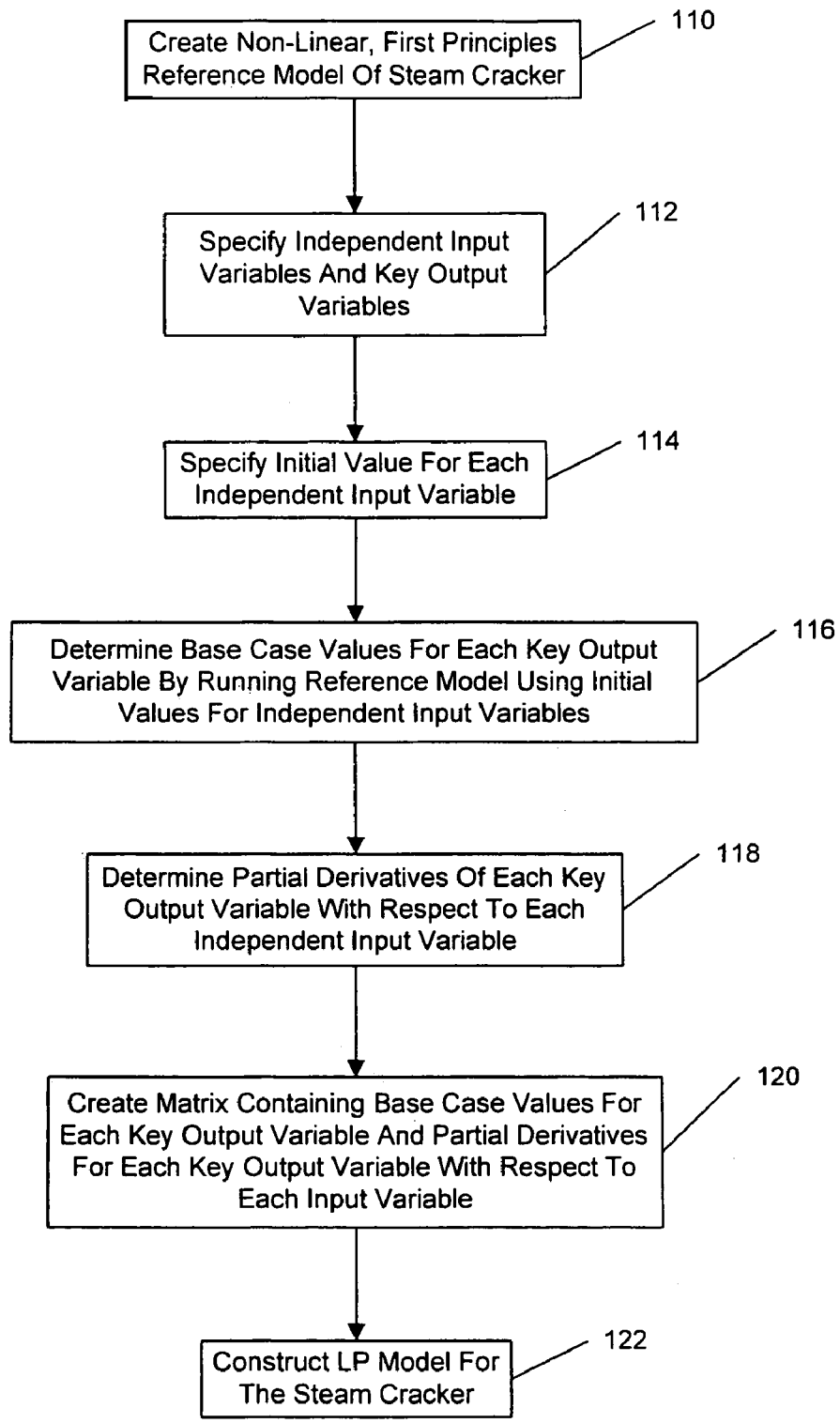
FIG. 1 is a flow chart showing the principal steps of a first embodiment of the present invention.

FIG. 1 is a flow chart showing the principal steps of an embodiment of the present invention for creating an LP model of a steam cracker. At step 110, a non-linear, first principles reference model of the steam cracker is created. As noted above, it is the new generation of first principles reference tools (such as AspenTech RT-OPT® and SimSci ROMeo®) that makes it possible to create a single computer model that accurately depicts the operation of an entire steam cracker (or other industrial process facility). Because the entire steam cracker is modeled using a single reference tool, the reference model is internally consistent across all process units included in the steam cracker. That is, the product from one process unit becomes the feed to the next process unit, and so on. Also, recycle streams are modeled on a consistent basis and flow back to the correct process unit. As the model solves (in simulation or optimization mode), the recycle streams are also solved to their correct final values. Energy flows are also modeled on a consistent basis. For example, as the main process path is solved (assuming some refrigeration temperatures), the required refrigeration loads are calculated. These refrigeration loads "flow" to the refrigeration unit that is also included in the model. The refrigeration unit, which is being solved at the same time, recalculates process refrigeration temperatures that are simultaneously passed back to the main process path. When the first principles model is solved in simulation mode (using a specified set of input conditions), a "snapshot" is obtained of how the model (and, therefore, the steam cracker, if the model is a good depiction of the steam cracker) will behave at those input conditions. This "snapshot" would include the effects of all non-linearities in steam cracker performance, as well as all interactions across separate process units (recycle streams, heat integration across process units, refrigeration integration, etc.).

The first principles reference model created at step 110 could be used to simulate and optimize the operation of the steam cracker. However, due to the enormous complexity associated with solving a first principles reference model of a steam cracker (resolution and refinement of thermodynamic data for an entire steam cracker is typically very computationally intensive), a huge amount of computing time and resources is required to run the model, especially in optimization mode. The time required to run a first principles reference model of a steam cracker is generally much too long to permit the reference model to be used effectively for interactively optimizing the operation of the steam cracker (e.g., for making feedstock selection and economic analysis decisions).

The present invention provides a method to overcome the above-described problem by converting the first principles reference model of the steam cracker into a LP model. As is well known in the art, LP models require substantially less computer time and resources to run than corresponding first principles models. Thus, the LP model provides an effective tool for use in planning and optimizing the operation of the steam cracker and selecting appropriate feedstocks.

A linear program (LP) addresses the problem of minimizing or maximizing a linear function subject to linear constraints. More specifically, a linear program (LP) is a problem that can be expressed as follows (the so-called Standard Form):

minimize cx subject to Ax=b x>=0 where x is the vector of variables to be solved for, A is a matrix of known coefficients, and c and b are vectors of known coefficients. The expression "cx" is called the objective function, and the equations "Ax=b" are called the constraints. All these entities must have consistent dimensions. The matrix A is generally not square, hence a LP is not solved by simply inverting A. Usually, A has more columns than rows, and Ax=b is therefore quite likely to be underdetermined, leaving great latitude in the choice of x with which to minimize cx. Linear programs can handle maximization problems just as easily as minimization (in effect, the vector c is just multiplied by −1).

Returning now to FIG. 1, at step 112 independent input variables and key output variables are specified. Preferably, the independent input variables are those input variables that can be independently controlled and that may have a significant impact on the overall performance of the steam cracker, provided that the user may elect to omit some of these input variables and treat them as fixed process parameters. Typically, the independent input variables would include feedstock flow rates and feedstock compositions (or, alternatively, flow rate for each feedstock component), flow rates for each component in all external feed streams, and critical operating parameters. Key output variables are those output variables the user desires to monitor in the final LP and, typically, would include output variables that directly impact the economic performance of the steam cracker, such as flow rate of each product, quality of selected products, amount of energy consumed, and values for potential system constraints.

At step 114 an initial value for each independent input variable is specified. Preferably, the initial values are selected such that the steam cracker's capacity utilization within the first principles model (and, therefore, in the final LP model as well) is in the general range for which the LP model is being constructed. For example, if the steam cracker being modeled is generally run full or nearly full, then the initial values should be selected such that the steam cracker's available capacity is substantially fully utilized. By doing this, non-linearities in the steam cracker performance will be correctly represented in the first principles model and will be accurately depicted in the primary area of interest (i.e., as the steam cracker approaches its constraints) in the final LP model.

Next, at step 116, the first principles reference model is run (in simulation mode) using the initial values for each independent input variable specified in step 114 to determine base case values for each key output variable. Assuming that the first principles reference model is an accurate depiction of the steam cracker, the base case values for the key output variables should accurately predict the actual performance of the steam cracker at the specified input conditions.

At step 118, partial derivatives for each key output variable with respect to each independent input variable are determined. In one embodiment, these partial derivatives are obtained by (1) selecting a first one of the independent input variables, (2) perturbing the value of the selected independent input variable, (3) running the first principles reference model using the perturbed value for the selected independent input variable and the initial values (from step 114) for all other independent input variables, (4) determining the resulting change in each of the key output variables from its base case value, (5) dividing the resulting change in each key output variable by the amount of the perturbation in the selected independent input variable to determine the partial derivatives of each key output variable with respect to the selected independent input variable, (6) resetting the selected independent input variable to its initial value, and (7) repeating steps (1) through (6) for each of the other independent input variables. Any reasonably sized perturbation may be used in step (2); however, where practical, the size of the perturbation in a well-scaled model is set at unity [e.g., one thousand pounds per hour (1.000 Mlb./hr.) for an input feed stream, where feed stream flow rates are measured in thousands of pounds per hour]. By setting the size of the perturbation at unity, the need to divide the resulting change in each key output variable by the amount of the perturbation to determine the partial derivatives [step (5) above] is eliminated. However, even in a well-scaled model where a large portion of the independent input variables can be perturbed by unity, exceptions will exist. For example, the steam to hydrocarbon ratio for a steam cracker furnace is typically in the range of 0.25 to 0.6. Accordingly, 0.1 is a more reasonable perturbation (a perturbation of 1.0 would be too high). Conversely, for a pressure initially set at 2500 Kpa, a perturbation of 1 Kpa would be too low and might produce "noisy" derivatives. In that case, a 10 Kpa perturbation would be preferable.

In another embodiment of the invention, the partial derivatives of each key output variable with respect to each independent input variable (step 118 in FIG. 1) are determined by performing a "sensitivity analysis." A sensitivity analysis, as described below, is a feature readily available in commercial non-linear optimization systems, such as the optimization systems used in AspenTech's RT-Opt® or SimSci's ROMeo®

A nonlinear program (NLP) addresses the problem of minimizing or maximizing a nonlinear function subject to nonlinear constraints. More specifically, a NLP is a problem that can be expressed as follows:

minimize O(x)

subject to $f(x)=0$ x min<=x<=x max where, x is the vector of variables, the expression "O(x)" is called the objective function, and the equations "f(x)=0" are called the constraints. The vector x consists of two types of variables, input variables, $x_I$, (also known as fixed or independent variables) and output variables, $x_D$, (also known as calculated or dependent variables). Constraints include those from the first principles reference model (i.e., the process model equations), as well as limits (inequality constraints) placed on output variables. All these entities must have consistent dimensions. A maximization problem can just as easily be handled by multiplying O(x) by −1.

Typical NLP software will use an iterative process (known as a "solver") to solve this problem. The process requires a set of initial estimates and a method to update the initial estimates. Typically, the vector of x is updated during the iterative process according to the algorithm $(x_{New} - x_{Current}) = -(J)^{-1} f(x)$, where f(x) is evaluated at the current set of x values, and "J" is the "Jacobian" matrix, which is defined as the matrix of partial derivatives of f(x) with respect to x. J can be provided analytically as part of the NLP solver, or can be computed via numerical perturbation of x, and subsequent differentiation of f(x).

Once J is computed (as part of the NLP solution process), a sensitivity matrix G (also known as gain matrix) can then be computed as:

$[G]^T = -[J_D]^{-1} \cdot [J_I]$, where $J_D$ and $J_I$ are columns of Jacobian matrix containing $x_D$, and $x_I$, and the superscript T on [G] stands for Transpose.

Some commercial NLP software, such as AspenTech's RT-Opt® or SimSci's ROMeo®, already have this functionality built into the software. Alternatively, persons skilled in the art of computer modeling and simulation could readily construct the sensitivity matrix G using procedures well known in the art.

It will be understood by persons skilled in the art that the sensitivity matrix G can be an extremely massive matrix, with thousands of rows and thousands of columns being common. The matrix of partial derivatives to be constructed according to the present invention (as described below in connection with step 120 of FIG. 1) is typically much smaller than the sensitivity matrix. However, the partial derivatives of each key output variable with respect to each independent input variable to be determined in step 118 of FIG. 1 are typically included in the sensitivity matrix G and may be extracted simply by instructing the NLP to output the desired partial derivatives.

Returning to FIG. 1, at step 120, the results from steps 116 and 118 are combined in a matrix (n+1) columns wide by m rows high, where "n" is the number of independent input variables and "m" is the number of key output variables. One column of the matrix contains the base case values for each key output variable from step 116, and the other n columns of the matrix contain the partial derivatives for each key output variable with respect to each independent input variable from step 118. Optionally, partial derivatives smaller than a pre-selected minimum value can be omitted from the matrix so as to reduce the total number of partial derivatives in the matrix and, therefore, the time required to solve the final LP using the matrix.

Persons skilled in the art of computer modeling will recognize that the rows and columns of the matrix could be reversed [i.e., creating a matrix (n+1) rows high by m columns wide] without departing from the true scope of the invention. Persons skilled in the art will also recognize that the use of a matrix is a convenient and conventional method to incorporate a set of partial derivatives into a LP model, and that other methods for incorporating the partial derivatives into a LP model (e.g., individual look-up tables for each key output variable) are essentially equivalent to the matrix approach.

Finally, at step 122, a LP model of the steam cracker is constructed using the matrix of base case values and partial derivatives. The resulting LP model may then be used to calculate the value of one or more of the key output variables from the matrix and a set of known and/or assumed values for the independent input variables. Preferably, this calculation is performed according to the following equation:

$$KOV_y = KOV_{y(base)} + \sum_{1}^{n} (I_x - I_{x(initial)})\left(\frac{\partial KOV_y}{\partial I_x}\right),$$

where $KOV_y$ represents the $y^{th}$ key output variable (y=1, ..., m), $KOV_{y(base)}$ represents the base case value for the $y^{th}$ key output variable, $I_x$ represents the known or assumed value for the $x^{th}$ independent input variable (x=1, ..., n), $I_{x(initial)}$ represents the initial value for the $x^{th}$ independent input variable, and $$\frac{\partial KOV_y}{\partial I_x}$$

represents the partial derivative of the $y^{th}$ key output variable with respect to the $x^{th}$ independent input variable.

The LP may also be used for optimization of the steam cracker operation. In this case, the LP preferably is built using a commercially available process industry modeling system (such as AspenTech PIMS® available from Aspen Technology, Inc., SimSci Petro® available form SimSci-Esscor, an operating unit of Invensys plc, or GRTMPS available from Haverly Systems, Inc.). The modeling system should employ an underlying linear solver and provide recursion and distributive recursion functionality. The matrix generated at step 120 forms the depiction of the steam cracker required for the LP. By adding feed prices and availabilities, product prices and demands, utility prices, and other external constraints, an economic model is formulated in the LP model, which can be used to optimize the operation of the steam cracker.

The process described above has a number of advantages over prior art methods for simulating the operation of a steam cracker. For example, because the LP was formed from a single first principles reference model of the entire steam cracker, inconsistencies resulting from the use of different engineering tools or starting points are eliminated. Moreover, the LP is consistent with the reference model (it has to be since it was derived from the reference model), and deviates from the reference model only as a function of the differences between the non-linear representation of the steam cracker in the reference model and the linearized representation of the steam cracker contained in the LP.

An important advantage of the present invention is that because the entire steam cracker is solved simultaneously, the need to create individual derived models of the various process units is eliminated. This avoids having to deal with recycle streams to previous process units (their impact is intrinsically and correctly contained in the partial derivatives contained in the LP matrix), and thus greatly simplifies the development of the LP. Also, other interactions among process units (e.g., interactions resulting from sharing a common refrigeration system) are also correctly accounted for in the LP, since the first principles reference model correctly depicted these interactions as it was solved and the partial derivatives for the LP were created. The fact that the effects of recycle streams and other interactions between process units are accurately accounted for in the LP results (even though these elements are not depicted in the LP) is a major advantage that was unknown and unexpected prior to Applicants' discovery thereof.

One of the most important advantages of the present invention is that it overcomes the maintenance problem, described above, that occurs when the steam cracker changes in such a way as to invalidate or make inaccurate the derived model of the steam cracker. As noted above, this can occur when, for example, the steam cracker performance changes over time (e.g., due to fouling), or operating configurations are altered (e.g., by invoking a multiple processing option), or the steam cracker's capacity utilization is significantly altered, or the steam cracker performance moves sufficiently far from the original derivation point so as to make the derived model inaccurate because of the non-linear effects in the steam cracker and, therefore, in the reference model. With the present invention, steam cracker changes (fouling, configuration, or new operating regime) are simply reflected in the first principles reference model, and the set of partial derivatives that depict the steam cracker in the LP are re-derived and updated in the LP. This can be accomplished in a relatively short period of time.

Another unexpected advantage of the present invention is that the size of the LP model can be substantially smaller than was possible with prior LP models because only the key output variables need to be represented in the final LP model. Other output variables can be included if desired, but only the key output variables need to be included in the final LP model.

Figure 2:
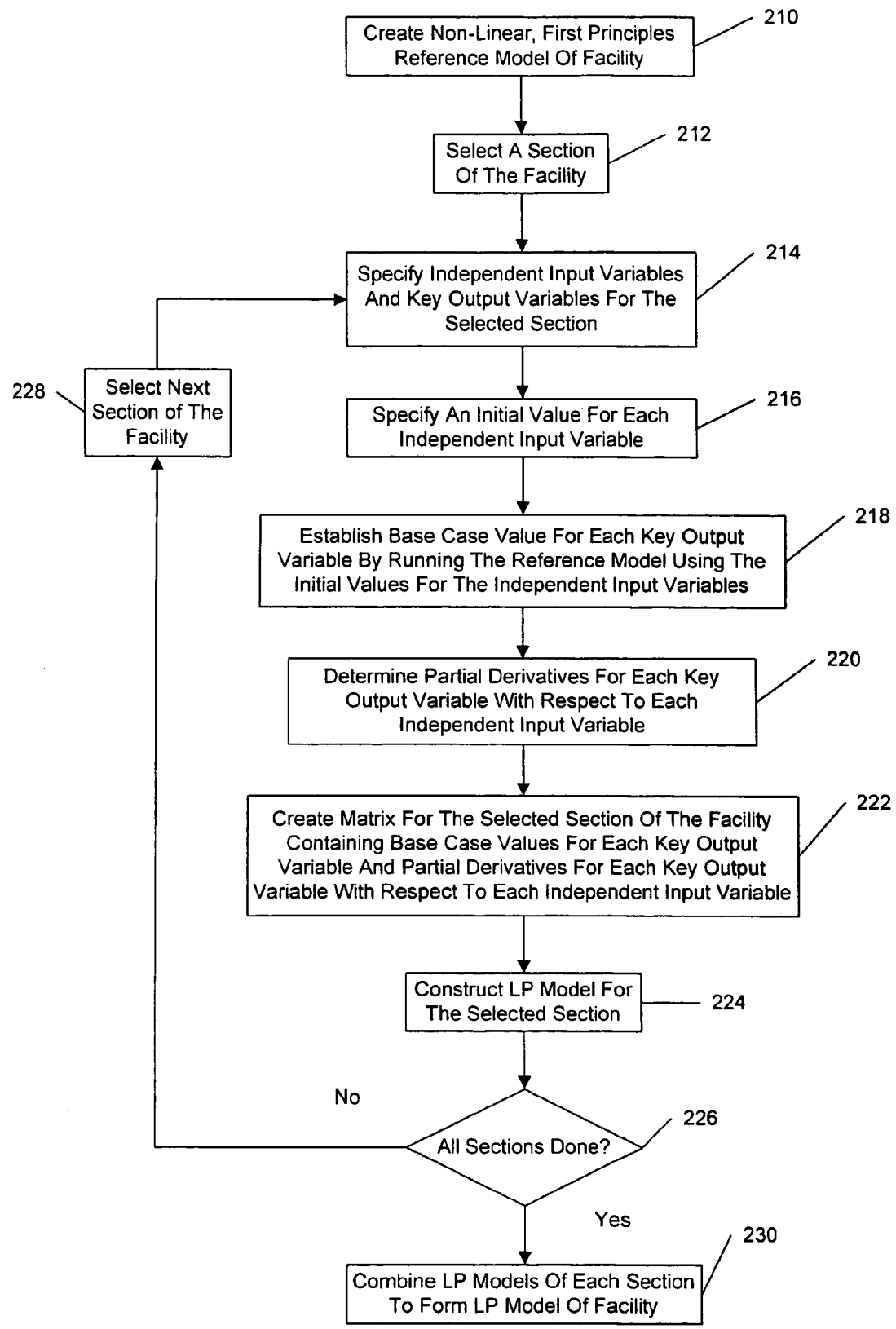
FIG. 2 is a flow chart showing the principal steps of a second embodiment of the present invention.

FIG. 2 is a flow chart showing the principal steps of another embodiment of the present invention. This embodiment is directed to a method for creating a linear programming (LP) model of an industrial process facility that includes at least two separate sections (e.g., two steam crackers), which sections can be operated either jointly or separately. As an example, assume that the facility includes two separate sections, A and B. If sections A and B are always operated together (i.e., section A never runs without section B, and section B never runs without section A), then it is preferable to model the facility using the method described above in connection with FIG. 1 (i.e., where a single matrix is created to depict both sections A and B in the final LP model). By contrast, if either section A or section B can be independently shut down while the other section continues to operate, then it is usually preferable to create a separate matrix for each section in the final LP model. This approach facilitates simulation and optimization of only one section of the facility when the other section is shut down.

According to this embodiment, a non-linear, first principles reference model of the facility is created at step 210. If there are significant interactions between the separate sections of the facility (at least some of the time), then it is preferable to include the entire facility in a single reference model. By doing so, the interactions between the sections are modeled on a consistent basis.

Next, at step 212, a first one of the sections is selected and, at step 214, independent input variables and key output variables for the selected section are specified. As with the previous embodiment, the independent input variables would likely include feedstock flow rates and feedstock compositions (or, alternatively, flow rate for each feedstock component), flow rates for each component in all external feed streams, and critical operating parameters for the selected section, and the key output variables would likely include flow rate of each product, quality of selected products, amount of energy consumed, and values for potential system constraints.

Next, at step 216, an initial value is specified for each independent input variable. Preferably, these initial values are selected so that the capacity utilization of the selected section within the model is representative of the anticipated actual utilization of the section being modeled, as more fully described above in connection with step 114 of FIG. 1.

At step 218, a base case value for each key output variable is established by running the reference model (in simulation mode) using the initial values for the independent input variables specified in step 216.

Next, at step 220, partial derivatives for each key output variable with respect to each independent input variable are determined. These partial derivatives may be determined according to any known method, including without limitation, the two methods described above in connection with the first embodiment (i.e., individually perturbing each independent input variable and determining the resulting change in each key output variable or by extracting the desired partial derivatives from a sensitivity matrix G generated from the Jacobian matrix created by the non-linear program in solving the reference model).

At step 222, the results of steps 218 and 220 are combined in a matrix for the selected section. The matrix will be (j+1) columns wide by k rows high, where "j" is the number of independent input variables for the selected section and "k" is the number of key output variables for the selected section. One column of the matrix contains the base case values for each key output variable from step 218, and the other j columns of the matrix contain the partial derivatives for each key output variable with respect to each independent input variable from step 220. Optionally, partial derivatives smaller than a pre-selected minimum value can be omitted from the matrix so as to reduce the total number of partial derivatives in the matrix and, therefore, the time required to solve the final LP using the matrix.

Next, at step 224, a LP model of the selected section is constructed using the matrix from step 222. The resulting LP model may then be used to calculate the value of one or more of the output variables for the selected section from the matrix and a set of known and/or assumed values for the input variables for the selected section. Preferably, this calculation is performed according to the following equation:

$$KOV_y = KOV_{y(base)} + \sum_{1}^{j} (I_x - I_{x(initial)}) \left( \frac{\partial KOV_y}{\partial I_x} \right),$$

where $KOV_y$ represents the $y^{th}$ key output variable (y=1, ..., k), $KOV_{y(base)}$ represents the base case value for the $y^{th}$ key output variable, $I_x$ represents the known or assumed value for the $x^{th}$ independent input variable (x=1, ..., j), $I_{x(initial)}$ represents the initial value for the $x^{th}$ independent input variable, and $$\frac{\partial KOV_y}{\partial I_x}$$

represents the partial derivative of the $y^{th}$ key output variable with respect to the $x^{th}$ independent input variable.

At step 226, a determination is made as to whether a LP model has been created for each section in the facility. If the answer is "no," at step 228, another section of the facility is selected and steps 214 through 226 are repeated for that section of the facility. This process continues until a LP model has been created for each section of the facility. The initial values for all independent input variables in the reference model should be the same as each section is modeled to ensure consistency between the sections at the derivation point.

Finally, at step 230, the LP models for each of the separate sections are combined to form the LP model for the facility. Appropriate linkages between the individual LP models must be included. For example, an output stream from an upstream section may become an input stream to a downstream section, or a recycle stream from a downstream section may be an input stream to an upstream section. However, since the separate LP models were each created based on the same reference model and at the same input conditions, inconsistencies between the separate LP models are avoided.

The embodiment of the invention described above in connection with FIG. 1 works very well for a steam cracker with a single fresh feed stream. That embodiment is also easy to extend to steam crackers in which multiple feed streams exist, but all these feed streams are combined into a single furnace header before entering the steam cracker's furnace section. In these situations, each component feed rate to the furnace section is treated as though it was independent, and the derivative of each key output variable is calculated with respect to each of these inputs. Then, in the LP model, the individual fresh feeds are blended to represent the furnace header to form the total fresh feed to the model.

The problem becomes more difficult when there are multiple furnace headers or multiple furnace types being used. The reason for this is that the impact (i.e., derivative) of a change (i.e., perturbation) to an individual furnace operating condition clearly depends on the amount and composition of the feed that furnace was processing at the time the change was made. Where a change in an individual furnace operating condition affects less than all of the feed, it becomes necessary to track the amount of feed affected by each change. The number of feeds, feed qualities, blending options, furnace types, and operating conditions per furnace type in a feed flexible steam cracker makes it more difficult to use the FIG. 1 embodiment of the invention directly.

Figure 3:
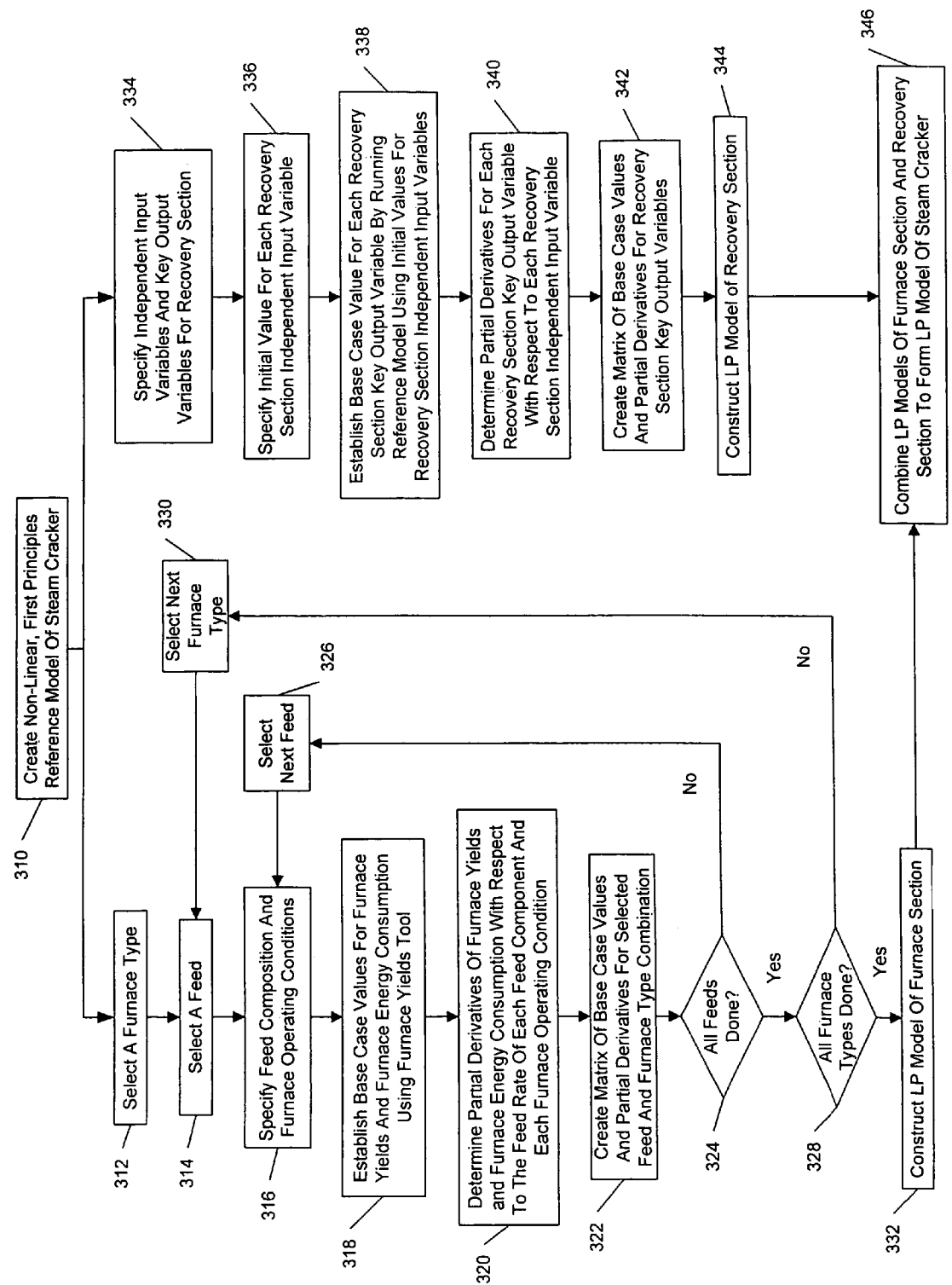
FIG. 3 is a flow chart showing the principal steps of a third embodiment of the present invention.

FIG. 3 shows the principal steps of an embodiment of the present invention for use in connection with a steam cracker having multiple possible feed types and/or multiple furnace types (i.e., furnace types having significant enough differences from each other to justify individual handling). As with previous embodiments, the inventive method begins, at step 310, with creation of a single non-linear, first principles reference model of the entire steam cracker.

For purposes of creating the final LP model, the steam cracker is divided into two sections, a furnace section where the hydrocarbon feedstocks are thermally cracked in the presence of superheated steam, and a recovery section where the cracked hydrocarbons are distilled and purified. According to this embodiment of the invention, separate LP models of the furnace section and the recovery section are created and these LP models are then combined to form the final LP model of the steam cracker.

As noted above, the furnace section is deemed to include at least two different feed types or furnace types. Accordingly, at step 312, a first furnace type is selected. If the steam cracker's furnace section includes more than one furnace of the selected type, then these furnaces may be modeled as a group rather than individually. Next, at step 314, a first feed type (or combined header of feed) is selected. Then, at step 316, the composition of the feed (or combined header of feed) and the furnace operating conditions for the selected furnace type are specified.

The petrochemical industry has developed certain engineering tools that can be used to predict furnace yields (e.g., the quantity of each hydrocarbon resulting from the cracking operation and the amount of energy consumed in the cracking operation) for a given feed (rate and quality) on a given furnace type at given operating conditions. One commercially available furnace yields tool is SPYRO®, which is a product of Technip-Coflexip SA. Other furnace yields tools would be well known to persons skilled in the art or could be developed by persons skilled in the art based on known principles of chemical thermodynamics and kinetics.

At step 318, such a furnace yields tool is used to predict base case values for furnace yields and furnace energy consumption for the selected furnace type and feed. The furnace yields tool may be incorporated in the non-linear, first principles reference tool or, alternatively, may be separate from the first principles reference tool.

At step 320, the furnace yields tool is used to determine partial derivatives of the furnace yields and furnace energy consumption with respect to the feedstock flow rates and feedstock compositions (or, alternatively, flow rates for each feedstock component) and each furnace operating condition. These partial derivatives may be determined by individually perturbing the feedstock flow rates and feedstock compositions (or, alternatively, flow rates for each feedstock component) and observing the resulting change in the furnace yields and furnace energy consumption. As with prior embodiments, the amount of the change must be divided by the amount of the perturbation in order to determine the partial derivatives.

The furnace yields calculated by a furnace yields tool are typically based on a given quantity of feed. When the feed rate of a particular feed component is perturbed, without adjusting the feed rates of the other feed components, the total quantity of feed is changed. For this reason, perturbations to the feed rate of each feed component or to the feedstock composition should preferably be very small so that the change in the total amount of feed is negligible. Since the partial derivative is the change in the output variable divided by the size of the perturbation, the resulting partial derivatives are still accurate.

Alternatively, as with previous embodiments, the furnace yields tool may be contained in a first principles reference tool adapted to calculate a sensitivity matrix G, or may be programmed to compute a sensitivity matrix G, and the desired partial derivatives may be extracted directly from the sensitivity matrix.

At step 322, a matrix of the base case values from step 318 and the partial derivatives from step 320 is constructed. This matrix will be used to depict the selected feed and furnace type combination in the final LP model.

Next, at step 324, a check is made to determine whether all feeds have been modeled with the furnace type selected in step 312. If the answer is "no," then at step 326 another feed type (or combined header of feed types) is selected and steps 316 through 324 are repeated for this feed and furnace type combination.

If the answer at step 324 is "yes," then at step 328 a check is made to determine whether all furnace types have been modeled. If the answer is "no," then at step 330 the next furnace type is selected and steps 314 through 328 are repeated for this furnace type.

If the answer at step 328 is "yes," then at step 332 the matrices for each feed and furnace type combination are used to construct a LP model of the furnace section. So, by way of example, if there are five possible feed types, and each one can go to six different furnace types, the LP model would contain 30 feed/furnace type matrices, one for each possible combination.

Persons skilled in the art will understand that the order of steps 312 and 314 could be reversed without departing from the scope of the present invention. In that case, the first step would be to select a first feed type (or header of feed types) and then construct matrices for that feed type combined with each furnace type before proceeding to the next feed type. The result of this process would be to construct the same set of matrices (e.g., the same 30 matrices for the example above), but in a different order.

The furnace section LP model constructed at step 332 may be used to determine the combined output of the steam cracker's furnace section. The rate of each feed for each furnace type times the yields from that feed/furnace type (as predicted by the matrix for that feed and furnace type combination) would produce the component effluent flow rates for that feed/furnace type. The furnace section LP then sums these component effluent flow rates from all possible feed/furnace type combinations to get the total component effluent flow rates from the furnace section for all feeds. In actual steam crackers, the various furnace effluents are typically combined to form a single feed stream to the recovery section. Accordingly, the output from the furnace section LP model is typically an input to the recovery section LP model. Similarly, the individual and total energy flows for the furnace section can be determined from the furnace section LP model.

The recovery section LP model is constructed (steps 334 through 344) in much the same manner as described above in connection with the FIG. 1 embodiment of the invention. At step 334, independent input variables and key output variables are specified for the recovery section. The recovery section independent input variables should include the various potential effluent components from the furnace section. At step 336, initial values for each recovery section independent input variable are specified. Preferably, the component effluent flow rates from the furnace section LP model are used for setting the initial values for the related recovery section input variables.

Next, at step 338, base case values for the recovery section key output variables are established by running the reference model (from step 310) using the initial values for the recovery section independent input variables from step 336. At step 340, partial derivatives for each recovery section key output variable are determined with respect to each recovery section independent input variable. These partial derivatives may be determined by individually perturbing the values of each recovery section independent input variable, running the reference model, and determining the impact on each recovery section key output variable in the manner described above with respect to the FIG. 1 embodiment of the invention. Alternatively, the partial derivatives may be extracted from a sensitivity matrix G generated from the Jacobian matrix created by the first principles reference tool in solving the first principles reference model, as more fully described above.

At step 342, a matrix of the base case values for the recovery section key output variables (from step 338) and the partial derivatives for each recovery section key output variable with respect to each recovery section independent input variable (from step 340) is created. At step 344, the matrix is used to construct a LP model of the recovery section in the manner described above with respect to the FIG. 1 embodiment of the invention.

Finally, at step 346, the LP model of the furnace section (from step 332) and the LP model of the recovery section (from step 344) are combined to form the LP model of the steam cracker. As with previous embodiments, feed prices and availabilities, product prices and demands, utility prices, and other external constraints may be added to the LP model so that it may be used to optimize the operation of the steam cracker.

Another embodiment of the present invention comprises a method for operating an industrial process facility. According to this embodiment, a LP model of the facility is constructed using any of the embodiments described above. The LP model is then used to simulate operation of the facility. Preferably, the LP model is used in optimization mode to determine the most profitable operating conditions given the known or assumed input conditions. The LP model may also be run in simulation mode to determine the potential effect of a planned or proposed change in operating conditions. The results of the simulation are then used to adjust at least one input condition (e.g., by changing feedstocks) or operating parameter (e.g., operating pressure and/or temperature) of the facility in order to achieve the desired effect.

EXAMPLE

Following is an example of the use of the present invention to create a LP model of a steam cracker. For this example, the non-linear, first principles reference model of the steam cracker was constructed using the ROMeo® reference tool described above. Although typical steam cracker LP models may contain as many as 250 or more input variables and 1000 or more output variables, the example has been limited to 12 input variables and 15 output variables. It will be understood that this is for purposes of illustration only, and should not be construed or interpreted as a limitation on the scope of the invention.

FIGS. 4A and 4B show an LP matrix constructed according to the present invention for the example steam cracker. Turning first to FIG. 4A, the left hand column (column 410) lists the output variables. Column 410 is also reproduced as the left hand column on FIG. 4B for purposes of clarity. Note that column 410 also includes, in the bottom 12 rows, the 12 input variables. This permits appropriate consistency checks to be performed, as will be more fully described below. The next column (column 412) identifies the units used for measurement of each variable. The next column (column 414) sets forth the base case value for each output variable as determined from the first principles reference model (top 15 rows of column 414), as well as the initial value for each input variable (bottom 12 rows of column 414). The next 12 columns of the matrix (columns 416 through 426 on FIG. 4A and columns 428 through 438 on FIG. 4B) contain the partial derivatives of each output variable with respect to each input variable. For example, column 416 contains the partial derivative of each output variable with respect to the quantity of methane (CH4) feed to the steam cracker. Similarly, column 418 contains the partial derivative of each output variable with respect to the quantity of ethylene (C2H4) feed to the steam cracker. Other input variables are the quantity of ethane feed to the steam cracker (column 420), the quantity of propylene feed to the steam cracker (column 422), the quantity of propane feed to the steam cracker (column 424), the quantity of butane feed to the steam cracker (column 426), the quantity of external (i.e., from sources other than the cracker's furnace section) methyl acetylene and propadiene feed to the steam cracker (column 428), the quantity of external propylene feed to the steam cracker (column 430), the quantity of external propane feed to the steam cracker (column 432), the steam cracker furnace conversion or severity (column 434), the steam cracker furnace steam to hydrocarbon ratio (column 436), and the cooling water temperature at the steam cracker (column 438).

The output variables include the products from the steam cracker (top six rows of column 410), the fuelgas production and fuelgas heat of combustion (expressed as a negative, by convention) (next two rows of column 410), certain utilities consumed by the steam cracker (next three rows of column 410), and certain constraints on the operation of the steam cracker (next four rows of column 410). As noted above, the last 12 rows of column 410 contain the 12 input variables. Note that the derivative of each input variable is unity (except where practicality dictates otherwise) with respect to itself and zero with respect to all other input variables. This serves several purposes. First, it shows the change in all of the input variables, and by examining the re-print of the input variables, it can be verified that only the desired variable has moved (i.e., the perturbed input variable). Second, it is the size of the perturbation ($\partial I_x$) that the change in the output variable ($\partial KOV_y$) must be divided by to compute the partial derivative.

For convenience, the top three rows (rows 440, 442, and 444) of columns 416 through 438 set forth the known or assumed value for each input variable (row 440), the initial value for each input variable (row 442), and the resulting change in the input variable (row 444).

Note that certain of the partial derivatives of the 15 output variables in columns 428, 430, 432, and 438 are blank. This means that the partial derivatives were either zero or less than a preselected minimum value and are excluded to avoid introducing computational "noise."

For each feed component pertubation of 1.000 Klb./hr., the partial derivatives of the steam cracker products should sum to 1.000 Klb./hr. to show that the overall material balance has been maintained. In FIG. 4A, the sum of the partial derivatives for the six products is 0.999 for methane (column 416), ethylene (column 418), and butane (column 426) and 1.000 for ethane (column 420), propylene (column 422), and propane (column 424). The difference between 1.000 and the 0.999 figure for methane, ethylene, and butane is due to round-off error.

Turning now to the last three columns of the matrix, column 446 sets forth the value of each output variable calculated by the LP, column 448 sets forth the value of each output variable calculated by the reference model for comparison purposes, and column 450 sets forth the error between the result obtained with the LP versus the value calculated by the reference model. Columns 448 and 450 have been included for purposes of evaluating the accuracy of the LP, but would not be included in an actual LP model according to the present invention. Note that with only two exceptions the error in the LP calculations for all output variables is less than 0.1%. The two exceptions identify output variables where significant non-linearities exist. This illustrates yet another advantage of the present invention, the ability to use a single non-linear reference model run to verify the accuracy of the LP model and identify areas of non-linearity. This information can be used to decide when the inaccuracies in the LP model are sufficient to warrant re-derivation of the matrix (matrices) of partial derivatives, which can be done with ease using the present invention.

The value set forth in the LP result column (column 446) is calculated according to the equation set forth above in connection with the FIG. 1 embodiment. As an example, applying that equation to the ethylene production output variable, the LP model's predicted ethylene production at the input conditions set forth in row 440 should be equal to the base case value (271.762 Mlb./hr.) plus the sum of the change in each input variable (row 444) times the partial derivative of the ethylene production output variable with respect to each input variable. That calculation yields the following:

|  | (Mlb./hr.) |
|---|---|
| Predicted ethylene production = base case value = | 271.762 |
| + (0.800 × 0.076) = | 0.061 |
| + (0.500 × 0.746) = | 0.373 |
| + (7.900 × 0.751) = | 5.933 |
| + (0.300 × 0.492) = | 0.148 |
| + (0.200 × 0.488) = | 0.098 |
| + (0.300 × 0.494) = | 0.148 |
| + (0.800 × 0.000) = | 0.000 |
| + (5.600 × 0.000) = | 0.000 |
| + (1.600 × 0.000) = | 0.000 |
| + (1.300 × −1.305) = | −1.697 |
| + (−0.050 × 6.212) = | −0.311 |
| + (2.900 × 0.000) = | 0.000 |
|  | 276.515 |

Note that the difference between the above result (276.515 Mlb./hr.) and the value listed in FIG. 4B (276.512 Mlb./hr.) is simply due to round-off error. The value predicted by the non-linear reference model is 276.473 Mlb./hr., which is only about 0.01% different from the value predicted by the LP model.

The invention has been described in accordance with its preferred embodiments. It will be understood, however, that various modifications and variations may be made to the invention. For example, the invention may be used to construct a LP model of any industrial process facility or combination of two or more industrial process facilities. All such modifications and variations are within the true scope of the invention, which is limited only by the appended claims.

We claim:

1. A method for creating a linear programming (LP) model of an industrial process facility, said method comprising the steps of:
   (a) using a first principles reference tool to create a non-linear reference model of said industrial process facility;
   (b) specifying a plurality of independent input variables and a plurality of key output variables;
   (c) specifying an initial value for each of said independent input variables;
   (d) running said reference model to determine base case values for each of said key output variables based on said initial values of said independent input variables;
   (e) determining partial derivatives for each of said key output variables with respect to each of said independent input variables;
   (f) creating a matrix at least (n+1) columns wide by at least m rows high, where "n" is the number of independent input variables and "m" is the number of key output variables, one column of said matrix containing said base case values for each of said key output variables from step (d) and the other n columns of said matrix containing said partial derivatives for each of said key output variables with respect to each independent input variable from step (e) except, optionally, those partial derivatives having a value smaller than a pre-selected minimum value; and
   (g) constructing a LP model of said industrial process facility, said LP model containing said matrix and being adapted to calculate the value of one or more of said key output variables from said matrix and a set of known and/or assumed values for said independent input variables.

2. The method of claim 1, wherein said independent input variables include, but are not limited to, feedstock flow rates and feedstock compositions (or, alternatively, flow rate for each feedstock component), flow rates for each component in all external feed streams, and operating parameters for said industrial process facility.

3. The method of claim 1, wherein said key output variables include, but are not limited to, rate of each product, amount of energy consumed, and values for potential system constraints.

4. The method of claim 1, wherein said step of determining partial derivatives for each of said key output variables with respect to each of said independent input variables further comprises the steps of (1) selecting one of said independent input variables, (2) perturbing the value of said selected independent input variable, (3) running said non-linear reference model using said perturbed value for said selected independent input variable and said initial values for all other independent input variables, (4) determining the resulting change in each of said key output variables from its base case value, (5) dividing said resulting change in each key output variable by the amount of said perturbation in said selected independent input variable to determine said partial derivatives, (6) resetting the selected independent input variable to its initial value, and (7) repeating steps (1) through (6) for each other independent input variable.

5. The method of claim 1, wherein said reference tool is adapted to generate a sensitivity matrix G from the Jacobian matrix created by said reference tool in solving said reference model, and wherein said step of determining partial derivatives for each of said key output variables with respect to each of said independent input variables further comprises extracting said partial derivatives from said sensitivity matrix.

6. The method of claim 1, further comprising adding prices, availabilities, and external constraints to said LP model, whereby said LP model may be used for simulation and/or optimization of said industrial process facility.

7. The method of claim 1, wherein said LP model is constructed according to the following equation:

$$KOV_y = KOV_{y(base)} + \sum_{1}^{n} (I_x - I_{x(initial)}) \left( \frac{\partial KOV_y}{\partial I_x} \right),$$

where $KOV_y$ represents the $y^{th}$ key output variable ($y = 1, \ldots, m$), $KOV_{y(base)}$ represents the base case value for the $y^{th}$ key output variable, $I_x$ represents the known or assumed value for the $x^{th}$ independent input variable ($x = 1, \ldots, n$), $I_{x(initial)}$ represents the initial value for the $x^{th}$ independent input variable, and $$\frac{\partial KOV_y}{\partial I_x}$$

represents the partial derivative of the $y^{th}$ key output variable with respect to the $x^{th}$ independent input variable.

8. The method of claim 1, wherein said industrial process facility is selected from the group consisting of petroleum refineries, catalytic and steam crackers, petrochemical plants, other chemical plants, facilities for converting natural gas and/or methanol into other hydrocarbons, natural gas liquefaction plants, polymer and plastics plants, steel mills, pharmaceutical manufacturing plants, electric power generating plants, and combinations thereof.

9. A method for creating a linear programming (LP) model of a steam cracker, said steam cracker adapted to convert various hydrocarbon feedstocks into other hydrocarbon products, said method comprising the steps of:
    (a) using a first principles reference tool to create a non-linear reference model of said steam cracker;
    (b) specifying a plurality of independent input variables and a plurality of key output variables;
    (c) specifying an initial value for each of said independent input variables;
    (d) running said reference model to determine base case values for each of said key output variables based on said initial values of said independent input variables;
    (e) determining partial derivatives for each of said key output variables with respect to each of said independent input variables;
    (f) creating a matrix at least (n+1) columns wide by at least m rows high, where "n" is the number of independent input variables and "m" is the number of key output variables, one column of said matrix containing said base case values for each of said key output variables from step (d) and the other n columns of said matrix containing said partial derivatives for each of said key output variables with respect to each independent input variable from step (e) except, optionally, those partial derivatives having a value smaller than a pre-selected minimum value; and
    (g) constructing a LP model of said steam cracker, said LP model containing said matrix and being adapted to calculate the value of one or more of said key output variables from said matrix and a set of known and/or assumed values for said independent input variables.

10. The method of claim 9, wherein said independent input variables include, but are not limited to, feedstock flow rates and feedstock compositions (or, alternatively, flow rate for each feedstock component), flow rates for each component in all external feed streams, and operating parameters for said steam cracker.

11. The method of claim 9, wherein said key output variables include, but are not limited to, rate of each product, amount of energy consumed, and values for potential system constraints.

12. The method of claim 9, wherein said step of determining partial derivatives for each of said key output variables with respect to each of said independent input variables further comprises the steps of (1) selecting one of said independent input variables, (2) perturbing the value of said selected independent input variable, (3) running said non-linear reference model using said perturbed value for said selected independent input variable and said initial values for all other independent input variables, (4) determining the resulting change in each of said key output variables from its base case value, (5) dividing said resulting change in each key output variable by the amount of said perturbation in said selected independent input variable to determine said partial derivatives, (6) resetting the selected independent input variable to its initial value, and (7) repeating steps (1) through (6) for each other independent input variable.

13. The method of claim 9, wherein said reference tool is adapted to generate a sensitivity matrix G from the Jacobian matrix created by said reference tool in solving said reference model, and wherein said step of determining partial derivatives for each of said key output variables with respect to each of said independent input variables further comprises extracting said partial derivatives from said sensitivity matrix.

14. The method of claim 9, further comprising adding prices, availabilities, and external constraints to said LP model, whereby said LP model may be used for simulation and/or optimization of said steam cracker.

15. The method of claim 9, wherein said LP model is constructed according to the following equation:

$$KOV_y = KOV_{y(base)} + \sum_{1}^{n}(I_x - I_{x(initial)})\left(\frac{\partial KOV_y}{\partial I_x}\right),$$

where $KOV_y$ represents the $y^{th}$ key output variable ($y=1, \ldots, m$), $KOV_{y(base)}$ represents the base case value for the $y^{th}$ key output variable, $I_x$ represents the known or assumed value for the $x^{th}$ independent input variable ($x=1, \ldots, n$), $I_{x(initial)}$ represents the initial value for the $x^{th}$ independent input variable, and $$\frac{\partial KOV_y}{\partial I_x}$$

represents the partial derivative of the $y^{th}$ key output variable with respect to the $x^{th}$ independent input variable.

16. A method for creating a linear programming (LP) model of a steam cracker, said steam cracker adapted to convert various hydrocarbon feedstocks into other hydrocarbon products, said steam cracker including at least a furnace section and a recovery section, said furnace section having multiple possible feed types (or headers of feed types) and/or multiple furnace types, said method comprising the steps of:
 (a) using a first principles reference tool to create a non-linear reference model of said steam cracker;
 (b) creating a LP model of said furnace section by:
  (1) selecting a feed type and a furnace type,
  (2) specifying feed composition, feed rate, and furnace operating conditions for the selected feed type and furnace type,
  (3) establishing a base case value for furnace yields and furnace energy consumption using a furnace yields tool,
  (4) determining partial derivatives of the furnace yields and furnace energy consumption with respect to the feedstock flow rates and feedstock compositions (or, alternatively, flow rates for each feedstock component) and each furnace operating condition,
  (5) creating a matrix for said feed type and furnace type combination, said matrix containing said base case values for each of said furnace yields and furnace energy consumption from step (b)(3) and said partial derivatives of the furnace yields and furnace energy consumption from step (b)(4) except, optionally, those partial derivatives having a value smaller than a pre-selected minimum value,
  (6) repeating steps (b)(2) through (b)(5) for other desired feed type and furnace type combination in said furnace section, and
  (7) constructing a LP model of said furnace section, said LP model containing said matrix for each feed type and furnace type combination in said furnace section and being adapted to calculate the products from said furnace section based on a set of known and/or assumed inputs to said furnace section;
 (c) creating a LP model of said recovery section by:
  (1) specifying independent input variables and key output variables for said recovery section,
  (2) specifying an initial value for each of said recovery section independent input variables, said recovery section independent input variables including flow rates of products from said furnace section,
  (3) establishing a base case value for each of said recovery section key output variables by running said reference model using said initial values for said recovery section independent input variables,
  (4) determining partial derivatives for each of said recovery section key output variables with respect to each of said recovery section independent input variables,
  (5) creating a recovery section matrix containing said base case values for each recovery section key output variable from step (c)(3) and said partial derivatives for each of said recovery section key output variables with respect to each recovery section independent input variable from step (c)(4) except, optionally, those partial derivatives having a value smaller than a pre-selected minimum value, and
  (6) constructing a LP model of said recovery section, said LP model containing said recovery section matrix and being adapted to calculate the value of one or more of said recovery section key output variables from said recovery section matrix and a set of known and/or assumed values for said recovery section independent input variables; and
 (d) using said LP models of said furnace section and said recovery section as said LP model of said steam cracker.

17. The method of claim 16, wherein said recovery section independent input variables include, but are not limited to, operating parameters for said recovery section.

18. The method of claim 16, wherein said recovery section key output variables include, but are not limited to, rate of each product from said recovery section, amount of energy consumed in said recovery section, and values for recovery section constraints.

19. The method of claim 16, wherein said step of determining partial derivatives for each of said recovery section key output variables with respect to each of said recovery section independent input variables further comprises the steps of (1) selecting one of said recovery section independent input variables, (2) perturbing the value of said selected recovery section independent input variable, (3) running said non-linear reference model using said perturbed value for said selected recovery section independent input variable and said initial values for all other recovery section independent input variables, (4) determining the resulting change in each of said recovery section key output variables from its base case value, (5) dividing said resulting change in each recovery section key output variable by the amount of said perturbation in said selected recovery section independent input variable to determine said partial derivatives, (6) resetting the selected recovery section independent input variable to its initial value and (7) repeating steps (1) through (6) for each other recovery section input variable.

20. The method of claim 16, wherein said reference tool is adapted to generate a sensitivity matrix G from the Jacobian matrix created by said reference tool in solving said reference model and wherein said step of determining partial derivatives for each of said recovery section output variables with respect to each of said recovery section input variables further comprises extracting said partial derivatives from said sensitivity matrix.

21. The method of claim 16, further comprising adding prices, availabilities, and external constraints to said LP model of said steam cracker, whereby said LP model may be used for simulation and/or optimization of said steam cracker.

22. A method for creating a linear programming (LP) model of an industrial process facility, said industrial process facility including at least two separate sections that can be operated either jointly or separately, said method comprising the steps of:
   (a) using a first principles reference tool to create a non-linear reference model of said industrial process facility;
   (b) creating a LP model for each of said separate sections of said industrial process facility by:
      (1) selecting a first section of said industrial process facility,
      (2) specifying independent input variables and key output variables for said section,
      (3) specifying an initial value for each of said independent input variables,
      (4) establishing a base case value for each of said key output variables by running said reference model using said initial values for said independent input variables,
      (5) determining partial derivatives for each of said key output variables with respect to each of said independent input variables,
      (6) creating a matrix for said section of said industrial process facility, said matrix containing said base case values for each of said output variables from step (b)(4) and said partial derivatives of each of said output variables with respect to each input variable from step (b)(5) except, optionally, those partial derivatives having a value smaller than a pre-selected minimum value,
      (7) constructing a LP model of said first section of said industrial process facility, said LP model containing said matrix and being adapted to calculate the value of one or more of said output variables from said matrix and a set of known and/or assumed values for said input variables, and
      (8) repeating steps (b)(2) through (b)(7) for each other section of said industrial process facility; and
   (c) combining said LP models of each section from step (b) to form said LP model of said industrial process facility.

23. The method of claim 22, wherein said step of determining partial derivatives for each of said key output variables with respect to each of said independent input variables further comprises the steps of (1) selecting one of said independent input variables, (2) perturbing the value of said selected independent input variable, (3) running said non-linear reference model using said perturbed value for said selected independent input variable and said initial values for all other independent input variables, (4) determining the resulting change in each of said key output variables from its base case value, (5) dividing said resulting change in each key output variable by the amount of said perturbation in said selected independent input variable to determine said partial derivatives, (6) resetting the selected independent input variable to its initial value, and (7) repeating steps (1) through (6) for each other independent input variable.

24. The method of claim 22, wherein said reference tool is adapted to generate a sensitivity matrix G from the Jacobian matrix created by said reference tool in solving said reference model, and wherein said step of determining partial derivatives for each of said key output variables with respect to each of said independent input variables further comprises extracting said partial derivatives from said sensitivity matrix.

25. The method of claim 22, further comprising adding prices, availabilities, and external constraints to said LP model of said industrial process facility, whereby said LP model may be used for simulation and/or optimization of said industrial process facility.

26. A method for operating an industrial process facility, said method comprising the steps of:
   (a) creating a linear programming (LP) model of said industrial process facility by:
      (1) using a first principles reference tool to create a non-linear reference model of said industrial process facility,
      (2) specifying a plurality of independent input variables and a plurality of key output variables,
      (3) specifying an initial value for each of said independent input variables,
      (4) running said reference model to determine base case values for each of said key output variables based on said initial values of said independent input variables,
      (5) determining partial derivatives for each of said key output variables with respect to each of said independent input variables,
      (6) creating a matrix at least (n+1) columns wide by at least m rows high, where "n" is the number of independent input variables and "m" is the number of key output variables, one column of said matrix containing said base case values for each of said key output variables from step (a)(4) and the other n columns of said matrix containing said partial derivatives for each of said key output variables with respect to each independent input variable from step (a)(5) except, optionally, those partial derivatives having a value smaller than a pre-selected minimum value, and
      (7) constructing a LP model of said industrial process facility, said LP model containing said matrix and being adapted to calculate the value of one or more of said key output variables from said matrix and a set of known and/or assumed values for said independent input variables;
   (b) using said LP model to optimize the operation of said petroleum and/or petrochemical facility; and
   (c) adjusting at least one input condition or operating parameter of said industrial process facility based on the results of said optimization.

27. The method of claim 26, wherein said independent input variables include, but are not limited to, feedstock flow rates and feedstock compositions (or, alternatively, flow rate for each feedstock component), flow rates for each component in all external feed streams, and operating parameters for said industrial process facility.

28. The method of claim 26, wherein said key output variables include, but are not limited to, rate of each product, amount of energy consumed, and values for potential system constraints.

29. The method of claim 26, wherein said step of determining partial derivatives for each of said key output variables with respect to each of said independent input variables further comprises the steps of (1) selecting one of said independent input variables, (2) perturbing the value of said selected independent input variable, (3) running said non-linear reference model using said perturbed value for said selected independent input variable and said initial values for all other independent input variables, (4) determining the resulting change in each of said key output variables from its base case value, (5) dividing said resulting change in each key output variable by the amount of said perturbation in said selected independent input variable to determine said partial derivatives, (6) resetting the selected independent input variable to its initial value, and (7) repeating steps (1) through (6) for each other independent input variable.

30. The method of claim 26, wherein said reference tool is adapted to generate a sensitivity matrix G from the Jacobian matrix created by said reference tool in solving said reference model and wherein said step of determining partial derivatives for each of said key output variables with respect to each of said independent input variables further comprises extracting said partial derivatives from said sensitivity matrix.

31. The method of claim 26, further comprising adding prices, availabilities, and external constraints to said LP model.

32. The method of claim 26, wherein said LP model is constructed according to the following equation:

$$KOV_y = KOV_{y(base)} + \sum_{1}^{n} (I_x - I_{x(initial)}) \left( \frac{\partial KOV_y}{\partial I_x} \right),$$

where $KOV_y$ represents the $y^{th}$ key output variable (y= 1, ..., m), $KOV_{y(base)}$ represents the base case value for the $y^{th}$ key output variable, $I_x$ represents the known or assumed value for the $x^{th}$ independent input variable (x=1, ..., n), $I_{x(initial)}$ represents the initial value for the $x^{th}$ independent input variable, and $$\frac{\partial KOV_y}{\partial I_x}$$

represents the partial derivative of the $y^{th}$ key output variable with respect to the $x^{th}$ independent input variable.

* * * * *